June 15, 1954
F. C. MOORE ET AL
2,681,297
VETERINARY ESTROGEN COMPOSITION AND ADMINISTRATION METHOD
Filed Oct. 31, 1950
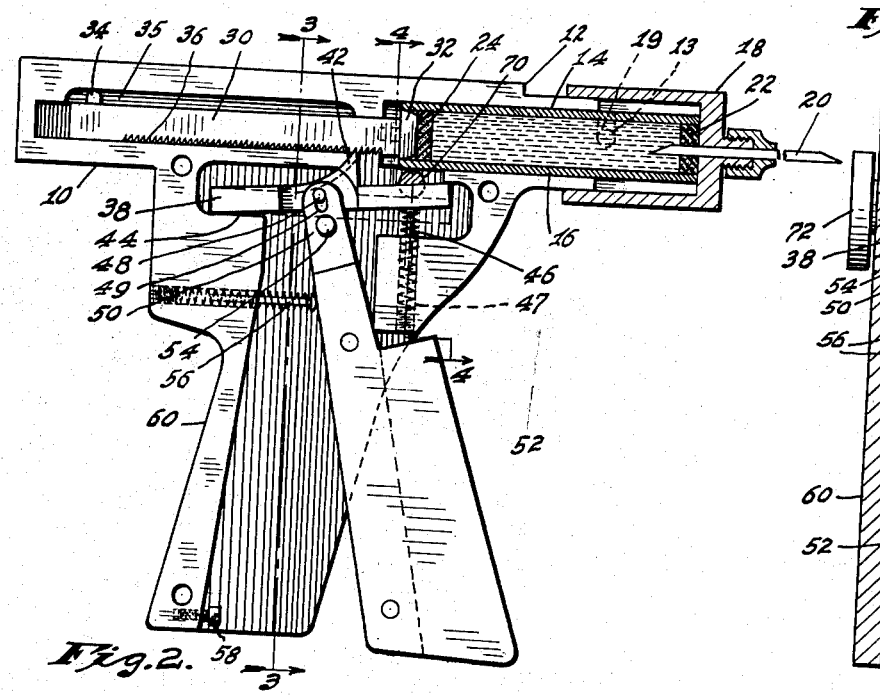
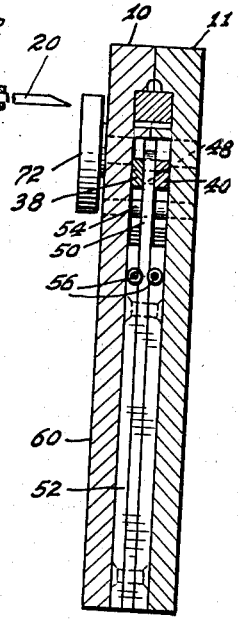
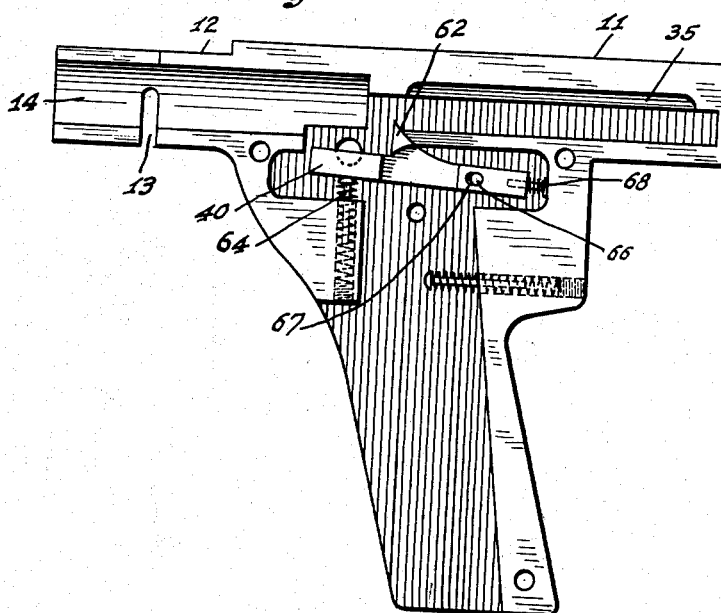
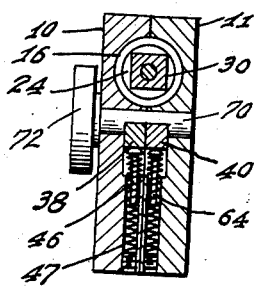
INVENTORS.
Frank C. Moore and
William Earl Mattox,
BY Schley, Trask & Jenkins
ATTORNEYS.

Patented June 15, 1954

2,681,297

UNITED STATES PATENT OFFICE 2,681,297

VETERINARY ESTROGEN COMPOSITION AND ADMINISTRATION METHOD

Frank C. Moore, Louisville, Ky., and William Earl Mattox, Indianapolis, Ind., assignors to Mattox and Moore, Inc., Indianapolis, Ind., a corporation of Indiana Application October 31, 1950, Serial No. 193,195

6 Claims. (Cl. 167—53.1)

This invention relates to a rapid and efficient method for administering veterinary medicaments, especially relatively water-insoluble medicaments, particularly insoluble estrogens, and to a composition for use with such method. A primary purpose of the method and composition is for "caponizing" fowl.

In the care and raising of domestic animals—cattle, hogs, fowl, etc.—it is frequently desirable to administer medicaments to large numbers of such animals. Such occasions arise not only with the administration of curative medicaments, but also with preventive medicaments, and especially with the administration of medicaments affecting the animal's growth or development, or the character or flavor of its meat. For example, chickens may be "caponized" by administration, usually subcutaneously, of estrogenic medicaments, and the economic practicability of such caponizing depends on the rapidity and efficiency with which such medicaments can be administered to flocks of large number of chickens. We use the term "caponizing" to refer to the de-sexing, usually temporary de-sexing of fowl of both sexes, to control their growth and development.

It is the primary object of our invention to provide a method and composition for the administration of medicaments to animals in large numbers, rapidly, safely, with a minimum of trouble, with a minimum of disturbance to the animals and their development, and without waste of the medicament used. It is a further object of our invention to provide such a method and composition which is especially advantageous for the administration of relatively insoluble medicaments in suspension, for example in finely sub-divided solid form, to provide a deposit of medicament within the body of the animal and from which the medicament may slowly absorb to produce a prolonged effect.

In a composition embodying our invention, the medicament is uniformly distributed throughout a non-toxic, water-soluble carrier, to form a composition in a physical state of semi-solid consistency, with sufficient plasticity to permit extrusion flow through a suitable injection needle when under a high extrusion pressure of administration, but with sufficient solidity to prevent flow through the injection needle in the absence of such extrusion pressure and to maintain uniformity and stability of distribution of the medicament throughout the composition. Our invention is of special advantage with compositions containing a finely divided medicament in suspension, especially because of such maintenance of uniformity of distribution and stability of the suspension.

In the method of our invention, we employ such a semi-solid extrudable composition containing a uniform and stable distribution of medicament, and dispense accurate measured doses of such composition by "extrusion injection"—extrusion under high pressure through an injection needle—desirably from a multiple-dose body of such composition. The extrusion injection is manually controlled, and the extrusion pressure may be created either manually or otherwise. The injection may be intramuscular, or preferably subcutaneous. Since the purpose of our extrusion injection is to introduce a semi-solid material and to produce a deposit of relatively insoluble solid and usually crystalline material at the site of injection, it is obviously inappropriate to administer our composition intravenously, and by "extrusion injection" we mean intramuscular and subcutaneous but not intravenous administration.

The function of the carrier in our composition is largely mechanical, but it should be a water-soluble material which is non-toxic to the animal in the quantity used. It may comprise one or more ingredients. Preferably, we use a so-called water-soluble wax, such as a polymerized polyethylene glycol, for example that available commercially under the trade-mark "Carbowax." Such water-soluble wax is non-toxic, it is readily dissolved by the animal body fluids and carried away from the site of injection and excreted, without objectionable absorption-retention. The desired plasticity of the composition may be controlled by the character of the water-soluble wax, as by the degree of polymerization or the molecular weight of a polyethylene glycol. Alternatively, the plasticity may be controlled by the addition of a non-toxic, water-soluble liquid plasticizer which is miscible with the water-soluble wax. The water-soluble waxes readily available on the market are generally of too little plasticity for our purposes, and we prefer to obtain the desired plasticity by mixing a miscible liquid plasticizer with one of such readily available water-soluble waxes. As the non-toxic miscible liquid plasticizer, we desirably use a polyhydric alcohol, such as glycerine, or preferably propylene glycol. Such polyhydric alcohols are substantially non-toxic, propylene glycol being the least toxic of the group. They are water soluble and miscible with the water-soluble wax, and they give a composition which is relatively heat stable and remains plastic at relatively low atmospheric temperatures without becoming fluid at high atmospheric temperatures.

The proportions of the water-soluble wax and the plasticizer can be varied considerably, to vary the plasticity of the semi-solid composition. The proportions may also vary depending upon the amount and character and physical state of the medicament used, for the presence of the medicament may affect the plasticity, for example, a finely divided solid medicament may stiffen the composition but at the same time tend to enhance its plasticity. The physical state of the final composition should be such as to permit ready extrusion through the injection needle under the extrusion pressure used, and should be of sufficient resistance to flow to prevent flow in the absence of extrusion pressure. The plasticity of our preferred compositions will not normally vary sufficiently with temperature changes to interfere with proper storage and use, but the physical state of the composition may be varied by changing the proportions of its water-soluble wax and of its plasticizer to suit it for use under extreme temperature conditions. For example, for cold-weather use, the proportion of plasticizer may be increased.

We desirably employ a semi-solid consistency with sufficient plasticity so that 0.2 cc. will be extruded through a 16-gauge needle in less than one second under a pressure which can be created manually through a convenient mechanical leverage system.

The composition and method is adapted for the administration of various medicaments, including both soluble and insoluble medicaments. The components of the carrier, being water-soluble, will be promptly absorbed by the animal body, and will leave no residue of foreign or slowly-absorbed character. They will dissolve water-soluble medicaments and make them promptly effective in the animal body.

Our composition and method are especially advantageous for the administration of relatively water-insoluble solid medicament in the composition, so that the administration will carry accurate quantities of the composition which it contains. The doses of the medicament which it contains. The components of the carrier are promptly absorbed, and deposit the water-insoluble medicaments in finely divided state in the animal body for slow absorption thereby. We have noted especially that injections of such suspensions of solid medicament produce no "foreign body" reaction in the animal.

We have found our composition and method to be especially advantageous for use in the administration of estrogens to animals, especially to fowl, as to produce increased weight gain and to improve the flavor and tenderness of the meat. For such purposes, we preferably use a water insoluble estrogen, of which there are a number known. These may be either natural or synthetic estrogenic substances. We have found it convenient to use the synthetic estrogenic substance diethylstilbestrol.

The following are examples of preparations of compositions in accordance with our invention.

*Example 1.*—"Carbowax 4000" and propylene glycol are heated to melt the "Carbowax" compound, and stirred to make a homogeneous mixture. The hot mixture is strained, and then cooled, and diethylstilbestrol in fine crystalline size is slowly mixed in. To insure uniformity of distribution of the diethylstilbestrol and smoothness in appearance, the mixture is thoroughly triturated. The relative amounts of propylene glycol and "Carbowax" used can vary widely depending upon the consistency desired, from a ratio of approximately 70 parts of "Carbowax" and 30 parts of propylene glycol, to a ratio of 30 parts of "Carbowax" and 70 parts of propylene glycol. We prefer to use, and in this example we do use, equal parts of "Carbowax" and propylene glycol. The amount of diethylstilbestrol can be varied to give the desired concentration in the final composition, which depends upon the quantity of composition to be administered per dose and upon the amount of diethylstilbestrol to be administered per dose. We preferably use a concentration of 75 mg. of diethylstilbestrol per cc. of final composition, so that the administration of 0.2 cc. of composition will provide a dose of 15 mg. of diethylstilbestrol.

The resulting composition is of a semi-solid consistency, resembling that of face-cream or of toothpaste, so that it is substantially stiff and non-flowing at normal atmospheric temperatures, but readily deforms under pressure and is readily extrudable. It is administrable in accordance with our method of administration, conveniently with the use of the extrusion injection gun described below, as for caponizing chickens.

*Example 2.*—A mixture of equal parts of "Carbowax" and propylene glycol, and 75 mg. of diethylstilbestrol per cc. of total mixture, are heated to a temperature of about 85° C., which melts the "Carbowax," and carries the diethylstilbestrol into solution in the hot mixture. The hot mixture is stirred to insure thorough and uniform distribution. The mixture is then poured while still fluid into multiple-dose cartridges, and allowed to cool. Upon cooling the diethylstilbestrol precipitates from solution in a desirable small crystalline size, in a uniform suspension throughout the composition.

This composition is in semi-solid state, stiff and non-flowing at normal atmospheric temperatures, but extrudable under pressure.

*Example 3.*—Equal parts of "Carbowax" and glycerine are heated and stirred to obtain a homogeneous mixture. The liquid mixture is strained and then partially cooled and an amount of diethylstilbestrol in fine crystalline size is slowly added to give a concentration of 75 mg. per cc. of final composition. The diethylstilbestrol is thoroughly distributed throughout the composition, and the composition is cooled to room temperature, whereupon it takes on a semi-solid physical state, stiff and non-flowing at normal atmospheric temperatures, but plastic and extrudable under pressure.

*Example 4.*—The preceding examples are repeated, save that instead of using diethylstilbestrol, other water-insoluble estrogenic substances are used, such for example as concentrated amorphous or crystalline preparations of natural estrone, with or without small varying amounts of other estrogenic materials.

*Example 5.*—Examples 1 to 3 are repeated save that instead of using the synthetic estrogenic substance diethylstilbestrol, other water insoluble synthetic estrogens are used, such for example as benzestrol, dienestrol, diethylstilbestrol dipropionate, ethinyl estradiol, hexestrol, etc.

Our compositions are administered by injecting measured quantities thereof by extrusion through a hollow needle under manual control and under elevated pressure.

The needle used may be of any desired size, and we prefer to use a hypodermic needle of about number 16 gauge. The extrusion pressure used may vary depending on the particular consistency of the composition, a relatively stiff consistency requiring a higher pressure, and vice versa. The pressure used is substantially higher than any used or possible with the ordinary hypodermic syringe, and is sufficient not only to produce extrusion of the semi-solid composition through the needle, but sufficiently higher than that to extrude the desired volume of composition quickly. Preferably, we use a pressure of from 200 to 500 or more pounds per square inch, and with the compositions of Examples 1 and 2 we desirably use a pressure of the order of 350 or 450 lbs. per square inch. The pressure may be created in any desired way, for example by a hydraulic ram, by motor, or manually through mechanism providing suitable mechanical advantage, as in the manually operated gun described below. Dispensing is preferably from a multiple dose quantity of composition, and the body of composition may be under constant pressure with the dispensing suitably controlled, as by a measuring valve means. Preferably, however, we apply pressure only during the actual dispensing, and extrude the desired shots by controlled displacement from the multiple dose quantity of composition; and in such case, we not only limit the volume displaced during each dispensing operation, but we relieve the pressure at the end of each such operation, and reduce the pressure to below that at which plastic extrusion of the semi-solid composition will occur, to avoid wasteful oozing or bleeding of the composition from the needle between injections.

The accompanying drawing illustrates an extrusion injection gun adapted for use in practicing our method of administration. In such drawing, Fig. 1 is a longitudinal section of a gun embodying our invention and showing the trigger-actuated rack pawl; Fig. 2 is a longitudinal section taken in the opposite direction from that of Fig. 1 and showing the rack holding pawl; Fig. 3 is a transverse section of the device of Fig. 1, taken on the line 3—3 of Fig. 1; and Fig. 4 is a transverse section taken on the line 4—4 of Fig. 1.

The injection gun shown in the drawing is conveniently made of two casing parts separable in a longitudinal plane, the left-hand part 10 being shown in Fig. 1 and the right-hand part 11 being shown in Fig. 2. The two parts 10 and 11 are complementary, and when assembled form the body of the gun. The front of such body is in the form of a barrel 12 having a cylindrical chamber 14 adapted to receive a cylindrical cartridge 16. The front of the barrel is closed by a cap 18, which is removably locked in place by a bayonet lock comprising two pins 19 carried by the cap 18 which take into L-shaped slots 13 in the barrel 12. The cap 18 has a forwardly extending, bored boss, which removably carries a double-ended extrusion-injection needle 20, which may for example correspond to a 16-gauge hypodermic needle, the rear end of which projects into the cartridge-chamber 14. The cartridge 16 comprises a cylindrical barrel closed at its forward end by a rubber or rubber-like stopper 22 adapted to be penetrated by the rear end of the needle 20 when the cap 18 is placed upon the barrel 12. The rear end of the cartridge 16 is closed by a rubber or rubber-like stopper 24 adapted to be advanced in the cartridge to expel its contents through the needle 20. The cartridge may be made of any suitable material, for example, glass, or preferably metal. It should be of substantially uniform internal cross-section, and of sufficient strength to withstand the high pressure used for extrusion of its semi-solid contents.

Behind the cartridge 16, the casing is formed to provide a guiding chamber for a plunger 30. Conveniently, the plunger 30 is of rectangular cross section, with a diagonal dimension somewhat less than the internal diameter of the cartridge 16, and its forward end is provided with a head 32 of circular cross section adapted to have a free sliding fit in the bore of the cartridge 16. The upper surface of the plunger 30 may carry a stop-pin 34 riding in a slot 35 in the casing 10—11 to limit plunger movement.

The lower surface of the plunger 30 is formed as a rack 36 whose teeth are uniformly spaced a distance equivalent to the movement desired for the extrusion of a single dose from the cartridge 16. The rack-tooth spacing and the internal diameter of the cartridge 16 are related to give the desired volume of medicament composition per shot, and the concentration of medicament in the medicament composition is adjusted to give the desired medicament dosage in such volume. In the device shown, we have found it convenient to use a rack-tooth spacing of fifty thousandths of an inch and for the cartridge have used standard "Pyrex" glass tubing of 17 mm. O. D. size. We have used such cartridges in a length to contain 10 cc. of medicament composition and extrude 0.2 cc. of medicament composition per shot. In caponizing chickens, for example, with such arrangement, we have used the compositions of the foregoing examples, containing 75 mg. of diethylstilbestrol per cc., to administer 15 mg. of diethylstilbestrol in each 0.2 cc. shot.

The rack 36 is engaged by two pawls 38 and 40, lying side by side in a compartment formed immediately below the rack 36. The pawl 38 is in the form of a straight bar having an upstanding tooth 42. Its rear end rides on the lower surface 44 of the pawl-containing compartment, and its forward end is yieldingly urged upward by a spring pressed plunger 46 mounted in a vertical bore 47 in the casing part 10. Such pawl 38 carries a pin 48 which is received in a slot 49 in the lever arm 50 of the trigger 52. The trigger 52 is pivotally mounted on a pin 54 carried by the casing parts 10 and 11. The lever arm 50 above such pivot 54 is relatively short with respect to the lower arm of the trigger 52, to provide a high mechanical advantage, conveniently of the order of 12 to 1, so that with a workable hand pressure of say 10 lbs. on the trigger the leverage produces a pressure on the contents of the cartridge of the order of 400 lbs. per square inch for extrusion. The handle of the trigger 52 is yieldingly urged forward by a pair of spring-pressed plungers 56 mounted in bores in the handle portion 60 of the gun. Rearward movement of the handle 52 may be limited by an adjustable stop screw 58.

The holding pawl 40 is similar in shape to the trigger-actuated pawl 38, and is similarly provided with an upstanding ratchet tooth 62 to engage the rack 36. Its front end is yieldingly urged forward by a spring-pressed plunger 64, and its rear end is positioned by a cross pin 66 carried by the casing and passing through a slot 67 in the pawl. Such slot is of limited elongation, to permit and limit longitudinal lost-motion movement of the pawl 40. A spring-pressed plunger 68 at the rear of the pawl 40 yieldingly urges it forward to the limit of its permitted movement.

Overlying the forward ends of the pawls 38 and 40 there is a transverse pin 70, half cut away where it crosses the pawls, to form a pawl retracting cam. A handle 72 on the end of such cam pin 70 permits it to be rotated to depress the front ends of the pawls and retract them from engagement with the rack 36.

To prepare the gun for operation, the pawls 38 and 40 are retracted by rotation of the handle 72 and cam pin 70, the cap 18 is removed, and a cartridge 16 is inserted in the bore of the barrel 12; and the cap 18 is then replaced to secure the cartridge in operative position. Removal and replacement of the cap 18 may be done with the needle 20 in place, and in such case the replacement of the cap 18 forces the rear end of the needle 20 through the front stopper 22 of the cartridge 16, into communication with its contents. The pawl-retracting handle 72 is now turned to its inoperative position, allowing both of the pawls 38 and 40 to engage the rack 36 on the plunger 30. The handle 52 may then be operated through one or two strokes to bring the plunger head 32 into firm engagement with the rear stopper 24 of the cartridge and to expel any air contained in the needle 20. The adjusting screw 58 is desirably adjusted to limit movement of the trigger 52 to a stroke which will move the pawl 38 a distance less than two tooth-spaces of the rack 36, so that on successive trigger strokes the pawl will pick up but one tooth of the rack at a time.

In using the gun, the trigger 52 is squeezed through a stroke to advance the plunger 36 one tooth-space. While the necessary movement of the trigger 52 can be mechanically limited to such a stroke, as by further adjustment of the screw 58, we find it preferable in practice to observe by ear and feeling when the holding dog 40 snaps over the next successive tooth of the rack 36 and to control the trigger stroke manually in response to that observation. Successive strokes extrude successive shots of composition from the cartridge 14 through the needle, and since the successive movements of the plunger are of uniform distances, the successive shots are of uniform volume.

As the plunger approaches the limit of each successive forward movement, the holding pawl 40, lying at the forward limit of its lost-motion movement, will snap into engagement with the next successive tooth of the rack 36. Thereafter, when the trigger actuated pawl 38 is retracted by release of the trigger 52, the plunger will be held toward its advance position by the holding pawl 40. This holding will not be positive, however, for the holding pawl 40 reacts against the spring-pressed plunger 68 and may yieldingly retract through the limited lost-motion permitted by the elongation of the slot 67. Thus while the plunger will be held in advanced position at the end of each stroke, it will be permitted to retract a limited amount against the relatively light opposing force of the spring-pressed plunger 68, and such retraction will release the extrusion pressure. In the absence of such extrusion pressure on the semi-solid composition, its flow will cease, and no bleeding or oozing of composition from the needle will occur between strokes of the trigger.

The following are examples of our method of administering our compositions:

*Example 6.*—The composition as prepared in Example 1 or 2 is used for caponizing chickens, with the aid of an extrusion injection gun of the type shown and described above. The composition is packaged in 50-shot glass or metal cartridges stoppered at each end with a rubber stopper.

Two guns were used, in the hands of two operators. Six persons caught the chickens and handed them to the gun operators. With each chicken, the gun operator lifted the skin on the chicken's neck between the thumb and index finger of his left hand, and thrust the needle on the nose of the gun into the skin toward the chickens head, in the open space between the comb and neck muscle. He then squeezed the trigger of the gun through one stroke, which extruded 0.2 cc. of composition into that space, thus administering 15 mg. of diethylstilbestrol to each chicken. The extrusion injections were placed as near the comb as possible so that subsequent removal of the head of the chicken would remove any unabsorbed residue. This was an extra precaution, however, for examination of chickens so treated ten days after such injections showed no sign of any such residue. Such injections were made about four weeks before the chickens were to be killed for market.

With the two gun-operators and six persons catching chickens, 10,000 chickens were treated in 3½ hours, at a rate per gun in excess of 1400 chickens per hour. In chickens so treated, the following results have been noted:

*a.* Immediately after treatment, the chickens returned to eating and drinking, and showed no evidence of shock or other adverse reaction from the injection.

*b.* The chickens began to consume a greater amount of feed within 36 hours after the injection.

*c.* The chickens became less active within 36 hours after injection.

*d.* The body weight of treated chickens was greater than that of untreated chickens at the end of ten days after the injection.

*e.* Treated chickens consumed more water than untreated chickens.

*f.* No ill effects were noted at any time.

*g.* No cannibalism was noted among treated chickens.

*h.* Treated cockerels were noted to lose their male characteristics.

*i.* Chickens so treated were observed to be more tender and of improved flavor, and would be considered top grade poultry.

*Example 7.*—The composition prepared in Example 1 or 2 was used for caponizing turkeys. The procedure was generally as set forth in Example 6, the turkeys being caught and handed to a gun operator equipped with an extrusion injection gun of the type shown in the drawings, loaded with a 50-shot cartridge of the composition. The turkeys were treated when they were about eight weeks old, about four weeks prior to the time they were to be killed for market. The injections were made in the loose skin back of the neck in a manner similar to that set forth in Example 6. With turkeys, however, a larger dose was desired, and for each injection, the gun operator squeezed the trigger of the gun through two successive strokes, to make an extrusion injection of a total of 0.4 cc. of composition and to administer 30 mg. of diethylstilbestrol. The observed results of such treatment were similar to those observed with chickens, and the turkeys showed improved weight gain and their meat had an improved flavor and tenderness.

The composition and method of our invention is rapid and efficient in use, and produces effective administration of the medicament used. The method differs substantially from the ordinary hypodermic injection and has a number of advantages thereover. The composition, being viscous to the point of semi-solidity permits accurate control of its flow, and effectively avoids drip or loss of medicament composition, and does so with an accuracy which is of special importance when large numbers of injections are to be given rapidly. It permits automatic dosage control, with no necessity for the operator to watch the progress of the injection, which makes for speed and efficiency. The semi-solid composition may contain the medicament in suspension, and is in effect a solid suspension—so that the suspension is highly stable and uniformity of medicament dosage can be accurately maintained. The carrier components being water soluble and readily carried away by the body fluids make for prompt effectiveness of the medicament, and leave no foreign-body residue.

The method also differs substantially from the known method of implantation of a solid pellet, which has been used for caponizing fowl. In that use, for example, our method is several fold faster than such implantation caponizing, and hence is of economic advantage thereover. Moreover, our method is more effective, in that it requires but a small needle puncture of the animal skin instead of the sizeable implantation incision, and it involves no danger of escape of the medicament through the skin opening, and eliminates the special precautions necessary to avoid such escape of an implanted pellet. It produces no foreign body reaction, such as the walling off of an implanted pellet; and it avoids the shock of implantation, so that the animals show no sign of discomfort, but immediately after the extrusion injection return to normal eating and drinking. Moreover, our composition, administered by our method, appears to produce a more prompt onset of the desired effect, which we believe results from the dissolving of a small part of the insoluble estrogen in the components of the carrier, particularly in the propylene glycol, and the carrying of that dissolved medicament into immediate effectiveness with the dissolving of those water-soluble components in the body fluids.

We claim as our invention:

1. The method of administering relatively water-insoluble diethylstilbestrol to meat-producing animals to promote improved meat production thereby, which comprises extruding in semi-solid state beneath the skin of the animal by forced plastic flow a quantity of a semi-solid, normally non-flowing, plastic composition of the relatively water-insoluble diethylstilbestrol uniformly distributed in a non-toxic, water-soluble, semi-solid carrier which comprises a homogeneous mixture of polyethylene glycols and a polyhydric-alcohol plasticizer and of which mixture at least 30% consists of polyethylene glycols having an average molecular weight not less than 4000, which carrier holds the relatively water-insoluble diethylstilbestrol in uniform distribution in the absence of water but dissolves in the presence of body fluids to release the diethylstilbestrol as a crystalline deposit at the site of injection.

2. The method of administering relatively water-insoluble estrogenic material to meat-producing animals to promote improved meat production thereby, which comprises extruding in semi-solid state beneath the skin of the animal by forced plastic flow a quantity of a plastic composition of the relatively water-insoluble estrogen uniformly distributed in a non-toxic, water-soluble, semi-solid carrier comprising at least 30% of a polyethylene glycol wax having an average molecular weight of about 4000, and a polyhydric-alcohol plasticizer, which composition is semi-solid and substantially non-flowing at normal atmospheric temperatures and holds the estrogen in uniform distribution in the absence of water but from which the carrier dissolves in the presence of body fluids to release the relatively water-insoluble estrogen as a deposit in solid state at the site of injection.

3. The method of administering relatively water-insoluble estrogenic material to meat-producing animals to promote improved meat production thereby, which comprises extruding in semi-solid state beneath the skin of the animal by forced plastic flow a quantity of a semi-solid, normally non-flowing, plastic composition of the relatively water-insoluble estrogen uniformly distributed in a non-toxic, water-soluble, semi-solid carrier comprising a polyethylene glycol wax having an average molecular weight of about 4000, and a polyhydric-alcohol plasticizer, which carrier holds the estrogen in uniform distribution in the absence of water but dissolves in the presence of body fluids to release the relatively water-insoluble estrogen as a deposit in solid state at the site of injection.

4. The method of administering a relatively water-insoluble estrogen to meat-producing animals to promote improved meat production thereby, which comprises extruding in semi-solid state by forced plastic flow through the skin a plastic composition which is semi-solid and substantially non-flowing in the absence of force and in which the relatively water-insoluble estrogen is uniformly distributed in a non-toxic, water-soluble, semi-solid carrier comprising a homogeneous mixture of polyethylene glycols and a polyhydric-alcohol plasticizer and of which at least 30% consists of polyethylene glycols having an average molecular weight not less than 4000, which carrier holds the relatively water-insoluble estrogen in uniform distribution in the absence of water but dissolves in the presence of body fluids to release the estrogen in relatively-insoluble solid state as a deposit at the site of injection.

5. A composition for administering a relatively water-insoluble estrogen by forced extrusion injection in semi-solid state through the skin of a meat-producing animal to promote meat production by such animal, consisting of a plastic composition which is semi-solid and substantially non-flowing at high atmospheric temperatures but is extrudable through a hypodermic needle under high pressure, and in which the relatively water-insoluble estrogen is uniformly distributed through a non-toxic, water-soluble, semi-solid carrier which holds the estrogen in uniform and stable distribution in the absence of water but dissolves in the presence of body fluids to release the relatively water-insoluble estrogen in solid state as a deposit at the site of injection, said carrier being a homogeneous mixture of polymerized polyethylene glycols and a polyhydric-alcohol plasticizer, and at least 30% thereof consisting of polymerized polyethylene glycols having an average molecular weight of about 4000.

6. A composition for administering the relatively water-insoluble diethylstilbestrol by forced extrusion injection in semi-solid state through the skin of a meat-producing animal to promote meat production by such animal, consisting of a plastic composition which is semi-solid and substantially non-flowing at high atmospheric temperatures but is extrudable through a hypodermic needle under high pressure, and in which the diethylstilbestrol is uniformly distributed, in a concentration of about 75 milligrams of diethylstilbestrol per cubic centimeter of composition, through a non-toxic, water-soluble, semi-solid carrier which holds the diethylstilbestrol in uniform and stable distribution in the absence of water but dissolves in the presence of body fluids to release the relatively water-insoluble diethylstilbestrol in solid state as a deposit at the site of injection, said carrier being a homogeneous mixture of polymerized polyethylene glycols and a polyhydric-alcohol plasticizer, and at least 30% thereof consisting of polymerized polyethylene glycols having an average molecular weight of about 4000.

References Cited in the file of this patent

UNITED STATES PATENTS

| Number | Name | Date |
| --- | --- | --- |
| 2,149,005 | Bockmuhl | Feb. 28, 1939 |
| 2,546,759 | Lee | Mar. 27, 1951 |
| 2,624,378 | Moore | Jan. 6, 1953 |

OTHER REFERENCES

McClelland—Chemical and Engineering News, vol. 23, February 10, 1945, pages 247 to 251.

Friedman—Journal of Laboratory and Clinical Medicine, May 1944, pages 530, 531.

Lorenz—Poultry Science, vol. 24, January 1945, pages 91, 92.

Vest—Journal of the American Medical Assoc., vol. 113, November 18, 1939, pages 1869 to 1872.

Annals of Surgery, October 1943, page 749.

Hamilton—Endocrinology, May 1939, pages 711 to 719.

"Carbowax" Compounds and Polyethylene Glycols, June 30, 1946, pages 5, 7.

Hall—Journal of Clinical Endocrinology, volume 9, April 1949, pages 382 to 384.

Perloff—Journal of Obstetrics and Gynecology, volume 59, January 1950, pages 223 to 225.